United States Patent Office 3,385,864
Patented May 28, 1968

3,385,864
1,3-BIS-ARYLIMINO-ISOINDOLINES
André Pugin, Riehen, Kurt E. Burdeska, Basel, and Alfred Staub, Binningen, Basel-Land, Switzerland, assignors to J. R. Geigy A.G., Basel, Switzerland
No Drawing. Filed Apr. 28, 1965, Ser. No. 451,606
Claims priority, application Switzerland, Apr. 30, 1964, 5,665/64
5 Claims. (Cl. 260—326.1)

ABSTRACT OF THE DISCLOSURE

The invention is directed to the process for the pigmenting of high molecular weight organic products, to the new pigments useable for such pigmenting, to the processes for the production of such pigments and to the colored high molecular weight organic materials as industrial products. The method comprises mixing with the high molecular weight material a colored compound of the formula

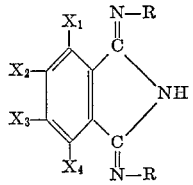

wherein each of $X_1$, $X_2$, $X_3$ and $X_4$ represents chlorine or bromine and R represents an unsubstituted, a non-ionogenically substituted or condensed phenyl radical.

---

The present invention concerns a process for the pigmenting of high molecular organic products, new pigments usable therefor, as well as processes for the production thereof. The invention also concerns, as industrial product, the colored high molecular, organic material.

"High molecular organic substances" which can be pigmented according to the invention and which are understood by this term as used in this specification and in the appended claims, can be of natural or synthetic origin and are, in particular, natural resins, drying oils or rubber, furthermore modified natural substances, e.g. chlorinated rubber, oil-modified alkyd resins or cellulose derivatives such as viscose, acetyl cellulose and nitrocellulose and, particularly, completely synthetic organic polymeric materials, i.e. plastics produced by polymerization, polycondensation and polyaddition. The following can be named in particular from this class of plastics: polyethylene, polypropylene, polystyrene, polyvinyl chloride, polyvinyl acetate, polyacrylonitrile, polyacrylic acid ester and polymethacrylic acid ester; polyester, in particular high molecular esters of aromatic polycarboxylic acids with polyfunctional alcohols; polyamides; the condensation products of formaldehyde with phenols, the phenolic resins, and the condensation products of formaldehyde with urea, thiourea and melamine, the so-called amino plastics; the polyester used as lacquer resins, both saturated such as alkyd resins as well as unsaturated such as maleinate resins, and also the polyaddition or polycondensation products of epichlorohydrin with diols or polyphenols known by the name of "epoxy resins"; in addition the so-called thermoplastics, i.e. polymeric materials which cannot be cured. Not only the uniform compounds but also mixtures of polymeric materials as well as mixed condensates and mixed polymers such as those based on butadiene can be pigmented according to the invention.

The pigmenting of such high molecular organic substances with 1,3-bis-arylimino-isoindolines the arylimino groups of which are derived from certain heterocyclic amines namely benzothiazoles, benzoxazoles and benzimidazoles, is known. But the color strength and the fastness properties of these pigmentings, in particular the fastness to solvents, cross lacquering, migration and light are not up to present day standards. Also these 1,3-bis-arylimino-isoindolines having a heterocyclic aryl radical have the disadvantage that on rubbing with zinc oxide they undergo a noticeable change in shade which change is proportional to the length of the rubbing. These undesirable properties are also present in the case of using pigments obtained from those if the above-mentioned class by halogenation in the 4-, 5-, 6- and 7-position of the isoindoline ring.

Furthermore, it has been found that the 1,3-bis-phenyl-imino-isoindolines used as intermediate products for the synthesis of phthalocyanine dyestuffs, the benzo radical of the isoindoline ring of which is unsubstituted, suffer from drawbacks which make them unsuited as pigments; in particular they lack fastness to light and solvents and possess only slight color strength, even if the phenylimino groups thereof bear nonionogenic ring substituents. Their color strength is even lower than that of the 1,3-bis-arylimino-iso-indolines containing heterocyclic arylimino groups.

It could be concluded from these facts that the pigmenting of high molecular organic substances with 4,5,6,7 - tetrahalogen - 1,3 - bis - phenylimino - isoindolines the phenyl radicals of which are neither nonionogenically substituted nor condensed, would have hardly better properties than pigmentings with such compounds the benzo radical of the isoindoline ring of which is not halogenated.

It has now been found that contrary to this expectation high molecular organic products can be pigmented with surprising fastness and color strength by incorporating into the same a colored compound of the formula

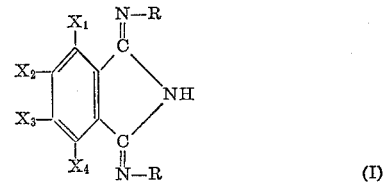

(I)

wherein each of $X_1$, $X_2$, $X_3$ and $X_4$ represents chlorine or bromine and R represents an unsubstituted, a non-ionogenically substituted or condensed phenyl radical.

The tautomeric Formula Ia can also be assigned to the compounds of the Formula I and all formulae analogous to Formula I are to be understood as including the tautomers of Formula Ia.

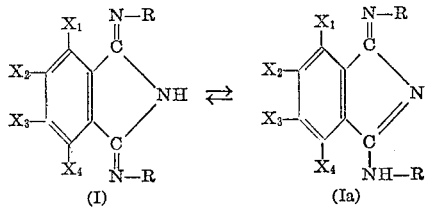

(I)   (Ia)

If R in Formula I is a non-ionogenically substituted phenyl radical then examples of substituents are: halogens such as fluorine, chlorine or bromine, lower alkyl groups such as the methyl, ethyl or butyl group, aryl groups such as the phenyl group and non-ionogenically substituted phenyl groups, lower alkoxy groups, e.g. the methoxy, ethoxy or butoxy group, aralkoxy groups such as the benzyloxy group, or aryloxy groups such as the phenoxy, methylphenoxy or halogenphenoxy groups, sulphonic acid amide and carboxylic acid amide groups optionally substituted at the nitrogen atom, which nitrogen substituents may be aliphatic groups, in particular lower alkyl hydroxyalkyl, halogenalkyl or cyanoalkyl groups, cycloaliphatic, araliphatic or aromatic groups; also sulfonic acid aryl ester, particularly phenyl ester or cresyl ester groups, carboxylic acid ester groups, acyl groups, i.e. carbacyl groups, e.g. low alkanoyl groups such as the acetyl or propionyl group, aroyl groups such as the benzoyl, methylbenzoyl and chlorobenzoyl groups, alkylsulfonyl groups such as the methylsulfonyl, ethylsulfonyl or butylsulfonyl groups, or arylsulfonyl groups such as the phenylsulfonyl, methylphenylsulfonyl or chlorophenylsulfonyl group, acylamido, particularly carbacylamido, alkoxycarbonylamido, cycloalkoxycarbonylamido, aralkoxycarbonylamido or optionally nitrogen-substituted ureido groups or dicarboxylic acid imido groups and, finally, the cyano or trifluoromethyl group. Mainly, aroylamido groups are used as carbacylamido groups, i.e., for example, benzoylamido or naphthoyl-(1 or 2)-amido groups the rings of which can be non-ionogenically substituted, e.g. by halogen, lower alkyl or lower alkoxy groups. The methoxy- and ethoxycarbonylamido groups are mentioned as alkoxycarbonylamido groups, the cyclohexyloxycarbonylamido group is mentioned as cycloalkoxycarbonylamido groups and, as example of aralkoxycarbonylamido groups, the benzyloxycarbonylamido groups is mentioned. Nitrogen-substituted ureido groups preferably correspond to the formula —HN—CO—NH—R' wherein R' is an aromatic group, mainly a phenyl radical optionally substituted by halogen, low alkoxy or alkyl groups. Dicarboxylic acid imido groups are derived from e.g. succinic acid, hexahydrophthalic acid, 1,4-endomethylene-hexahydrophthalic acid, phthalic acid, chlorinated phthalic acid, naphthalic acid or from pyridine dicarboxylic acid.

If R is a condensed phenyl radical, then the aminobenzo component can complete both carboxylic as well as heterocyclic structures.

Preferably both R's are identical non-ionogenically substituted phenyl radicals. The expression "non-ionogenically substituted," whenever appearing in the invention description is used to designate that compounds or radicals are substituted by groups which do not dissociate acid in neutral water.

Depending on the properties of colored products obtained with the pigments according to the invention, the following classes of novel pigments falling under Formula I can be distinguished:

(A) Pigments falling under Formula I, which are distinguished by affording especially in prints e.g. on paper and the like, pigmentings of very good color strength, resistance to solvents and light fastness, are those in which the substituents R are naphthyl, chloronaphthyl, fluorenonyl, anthraquinonyl or halogenophenyl, especially chlorophenyl or bromophenyl; the halogenophenyl radical can be further substituted by lower alkyl, lower alkoxy, trifluoromethyl or cyano.

(B) Another class of isoindoline pigments according to the invention which is distinguished by affording especially in natural and synthetic polymeric resin materials pigmentings of good light fastness and very good fastness to cross lacquering and to migration, comprises the compounds of Formula I in which R is a carbamylphenyl radical of the formula

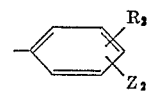

wherein $R_1$ represents hydrogen, lower alkyl, or an aryl radical which is either phenyl or naphthyl, and which aryl radical is substituted by at least one of the substituents hydrogen, chlorine, bromine, lower alkyl, lower alkoxy, lower alkanoylamino, benzoylamino, chlorobenzoylamino, bromobenzoylamino, lower alkyl-benzoyl amino and lower alkoxy-benzoylamino; and $Z_1$ represents hydrogen, chlorine, bromine, lower alkyl, lower alkoxy, carbamyl, N-phenyl-carbamyl, N-chlorophenyl-carbamyl, N-bromophenyl-carbamyl, N-(lower alkyl-phenyl)-carbamyl or N-(lower alkoxy-phenyl)-carbamyl.

(C) A third class of pigments according to the invention which affords especially in paints and lacquers, e.g. for use in the automobile industry, pigmented products of good resistance to solvents and good fastness to light, to cross-lacquering and to migration, comprises those pigments falling under Formula I in which R represents a carbacylamido-phenyl radical of the formula

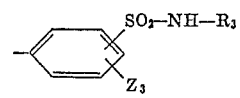

wherein $R_2$ represents lower alkanoylamino, lower alkoxycarbonylamino, or the following acrylamido groups: benzoylamino, chloro-benzoylamino, bromo-benzoylamino, lower alkyl-benzoylamino, lower alkoxy-benzoylamino, phthalimido, phthalimido-phenyl, lower alkyl-phthalimido-phenyl, lower alkoxy-phthalimido-phenyl, chlorophthalimido-phenyl, chloro-phthalimido, succinimido, quinolinoyl-imido, carbamido, N-lower alkylcarbamido, N-phenyl-carbamido, N-chlorophenylcarbamido, N-bromophenyl-carbamido, N-(lower alkylphenyl)-carbamido or N-(lower alkoxy-phenyl)-carbamido; and $Z_2$ represents hydrogen, chlorine, bromine, lower alkyl, lower alkoxy, phenoxy, chlorophenoxy, bromophenoxy or lower alkyl-phenoxy.

Preferred are those pigments of this class in which $R_2$ represents an aroylamido group the aryl radical of which contains chlorine, or a dicarboxylic acid imide group, especially a phthaloyl imide group.

(D) Finally, isoindoline pigments according to the invention, the pigmentings of which especially lacquers show exceptionally good resistance to solvents and fastness to cross lacquering and migration are those falling under Formula I in which R represents a sulfamylphenyl radical of the formula

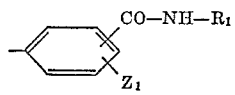

wherein $R_3$ represents hydrogen, lower alkyl or hydroxy-lower alkyl, $Z_3$ represents hydrogen, chlorine, bromine, lower alkyl or lower alkoxy.

4,5,6,7-tetrahalogen-isoindolines usable according to the invention and falling under Formula I wherein R is a non-ionogenically substituted or condensed phenyl radical and $X_1$, $X_2$, $X_3$ and $X_4$ each represent chlorine or bromine, are obtained by reacting a compound of the formula

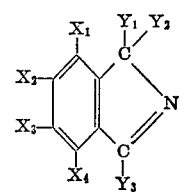

wherein each of $Y_1$, $Y_2$ and $Y_3$ represent a monovalent reactive substituent and $Y_1$ and $Y_2$ together also represent a divalent reactive substituent and $X_1$, $X_2$, $X_3$ and $X_4$ have the meanings given in Formula I, with two equivalents of a non-ionogenically substituted or condensed primary phenylamine.

As monovalent reactive substituents, $Y_1$, $Y_2$ and $Y_3$ each preferably represents chlorine, an etherified hydroxy group for instance, an alkoxy group such as methoxy or ethoxy group or an aryloxy group, such as phenoxy, methylphenoxy or chlorophenoxy group, or a tertiary amino group, in which case, preferably the morpholino group.

If $Y_1$ and $Y_2$ together represent a divalent reactive substituent then this is preferably an imino group of the formula $=$N—R'; in this case $Y_3$ is advantageously an amino group of the formula —NH—R'. In these formulae, R' represents hydrogen or an alkyl group optionally containing non-ionogenic substituents, e.g. the methyl, ethyl, butyl, γ-methoxypropyl or β-hydroxyethyl group; preferably R' is hydrogen. As indicated above, isoindolines of this type can occur in tautomeric forms; the tautomeric structures are also embraced by the drawing of a structural formula.

Starting materials of Formula II wherein $Y_1$, $Y_2$ and $Y_3$ each represents chlorine are obtained by reacting tetrachloro- or tetrabromophthalimide with phosphorus pentachloride; if tetrabromophthalimide is used, then individual bromine atoms can be exchanged for chlorine atoms. By reacting this 1,3,3-trichloro-isoindoline compound of Formula II with an alkali metal alcoholate or phenolate or with a secondary amine, starting materials of the Formula II are obtained wherein $Y_1$, $Y_2$ and $Y_3$ each represent an etherified hydroxy group or tertiary amino group. If a 1,3,3-trichloro-isoindoline compound of Formula II is reacted with an amine of the formula R'—NH$_2$, then starting materials of Formula II are obtained wherein $Y_1$ and $Y_2$ together represent the imino group of the formula $=$N—R' and $Y_3$ represents the amino group of the formula —NH—R'.

The reaction of non-ionogenically substituted or condensed primary phenylamines with a compound of Formula II wherein each of $Y_1$, $Y_2$ and $Y_3$ is chlorine, is preferably performed by heating the two starting substances in the absence of compounds containing hydroxyl groups, advantageously to temperatures of 50 to 250° C., whereby generally the hydrogen chloride which is split off is released from the reaction mixture. Advantageously the reaction partners are reacted in an inert solvent, e.g. in an optionally halogenated or nitrated hydrocarbon. Instead of allowing the hydrogen chloride to escape, it can be bound with suitable acid binding agents, e.g. by means of an excess of the phenylamine to be reacted or by means of a tertiary amine such as triethylamine, N,N-diethyl-aniline or pyridine; in this case the reaction can be performed at room temperature. The word "low" as used in this specification and in the appended claims in connection with "alkyl" and "alkoxy" means that those radicals have from 1 to 5 carbon atoms, in connection with "alkanoyl" it means a radical of from 2 to 5 carbon atoms.

The reaction of a non-ionogenically substituted or condensed primary phenylamine with a compound of Formula II wherein $Y_1$ and $Y_2$ together are $=$N—R', preferably $=$NH, and $Y_3$ is —NH—R', especially —NH$_2$, is advantageously performed by heating the reaction partners in an organic solvent. As organic solvents, optionally halogenated or nitrated aromatic hydrocarbons, higher boiling alcohols, e.g. benzyl alcohol or ethylene glycol and its monoether can be used; particularly suitable solvents are fatty acids such as glacial acetic acid.

Compounds of Formula II wherein each $Y_1$, $Y_2$ and $Y_3$ is an etherified hydroxy group or tertiary amino group are advantageously reacted with the non-ionogenically substituted or condensed phenylamine in the presence of an organic acid, especially in acetic acid. This reaction occurs even in water.

In all these modifications of the process, the crude pigments generally precipitate while the reaction mixture is hot and, by filtering off and, optionally by washing with organic solvents, they can be isolated in a pure form suitable for analysis.

In general, the pigments usable according to the invention have a good texture and in most cases can be used as crude products. If necessary or desirable, the crude products can be converted by milling or kneading into a finely dispersed form. For this purpose, advantageously milling auxiliaries are used such as inorganic and/or organic salts in the presence or absence of organic solvents. Often, an improvement of the properties can also be attained by heating the crude pigments in hot organic solvents. After milling, the auxiliaries are removed in the usual way, soluble inorganic salts, e.g. with water and water insoluble organic auxiliaries, e.g. by steam distillation Pigments usable according to the invention are particularly suitable for the colouring of vinyl, polyolefin and styrene polymers such as polymeric materials, and so-called film formers or binders known as crude materials for lacquers, particularly linseed oil varnish, nitrocellulose, alkyd resins, melamine resins and urea-formaldehyde resins. The high molecular organic substances are pigmented with the pigments of Formula I, for example, by mixing such a pigment, optionally in the form of master batches, with these substrata using sets of mixing rollers, mixing or milling apparatus. The pigmented material is then made into the desired final form by the usual known processes such as calendering pressing, extrusion, spreading, pouring or injection moulding. To produce non-rigid articles or to reduce their brittleness, it is often desirable to incorporate so-called plasticisers into the high molecular compounds before forming. Esters of phosphoric acid, phthalic acid or sebacic acid, for example, can serve as such. The plasticiser can be incorporated into the polymeric materials before or after incorporation of the pigment dyestuff in the process according to the invention. To attain various shades, it is also possible to add fillers or other colour-imparting components such as white, coloured or black pigments, in any amounts desired, to the high molecular organic substances in addition to the compounds of Formula I.

To pigment lacquers and printing inks, the high molecular organic materials and the compounds of Formula I, optionally together with additives such as fillers, other pigments, siccatives or plasticisers, are finely dispersed or dissolved in a common organic solvent or mixture of solvents. This can be done by dispersing or dissolving the individual components separately or dispersing or dissolving several of them together and then bringing all components together.

High molecular organic materials pigmented according to the invention generally contain amounts of 0.001 to 30% by weight of a compound of Formula I, calculated on the high molecular organic substance to be pigmented, polymeric materials and lacquers preferably contain 0.1 to 5% by weight, printing inks preferably contain 10 to 30% by weight. The amount of pigment to be chosen depends in the first place on the desired colour strength, then on the thickness of the article and finally, on any content of white pigment there may be in the polymeric material.

High molecular organic substances pigmented according to the invention have very fast greenish yellow, yellow, orange, red, bordeaux or brown shades; also the fastness properties in use are generally very good.

The following non-limitative examples illustrate the invention further. The temperatures are given therein in degrees centigrade. Percentages are given by weight unless expressly stated otherwise.

EXAMPLE 1

6.9 g. of 1,3,3-trimethoxy-4,5,6,7-tetrachloroisoindolenine and 11.24 g. of 2-chloro-5-aminobenzoic acid-(4'-chlorophenylamide) in 270 g. of glacial acetic acid are boiled for 5 minutes. The yellow dyestuff which precipitates is filtered off while still hot and washed first with ethanol then with acetone and dried.

In this way 15.6 g. of a greenish yellow pigment of the formula given below are obtained. It has very good fastness to cross lacquering, migration and light.

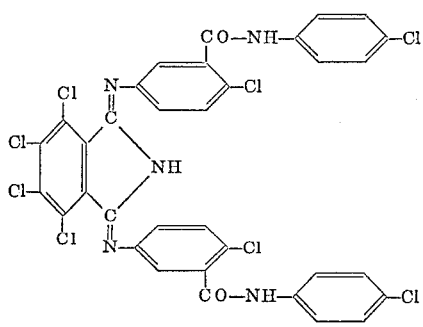

The same pigment is obtained if, instead of 6.9 g. of 1,3,3-trimethoxy-4,5,6,7-tetrachloroisoindolenine, 10.2 g. of 1,3,3-trimorpholino - 4,5,6,7-tetrachloroisoindolenine, 5.6 g. of 1-amino-3-imino-4,5,6,7-tetrachloroisoindolenine or 6.2 g. of 1-methylamino-3-methylimino-4,5,6,7-tetrachloroisoindolenine are used.

If the 11.24 g. of 2-chloro-5-aminobenzoic acid-(4'-chlorophenylamide) are replaced by equimolar amounts of one of the amines given in the following Table 1, then with otherwise the same procedure, similar fast pigments having the shades given in column 3 are obtained.

TABLE 1

| No. | Amine | Shade of print on paper |
|---|---|---|
| 2 | 4-amino-2-chloro-benzamide | Greenish yellow. |
| 3 | 5-amino-2-chloro-N-phenyl-benzamide | Do. |
| 4 | 5-amino-2-chloro-N-(2,4-dichlorophenyl)-benzamide | Do. |
| 5 | 5-amino-2-chloro-N-(2,5-dichlorophenyl)-benzamide | Do. |
| 6 | 5-amino-2-chloro-N-(2,5-dichlorophenyl)-benzamide | Do. |
| 7 | 5-amino-2-chloro-N-(4-methylphenyl)-benzamide | Do. |
| 8 | 5-amino-2-chloro-N-(4-methoxyphenyl)-benzamide | Do. |
| 9 | 5-amino-2-chloro-N-(4-acetamidophenyl)-benzamide | Do. |
| 10 | 5-amino-2-chloro-N-(4-benzamidophenyl)-benzamide | Yellow. |
| 11 | 5-amino-2-chloro-N-[4-(4-chlorobenzamido)phenyl]-benzamide | Do. |
| 12 | 5-amino-2-chloro-N-[4-(4-bromobenzamido)phenyl]-benzamide | Do. |

TABLE 1—Continued

| No. | Amine | Shade of print on paper |
|---|---|---|
| 13 | [structure: 4-amino-2-chlorobenzoyl-NH-phenyl-NH-CO-2-methylphenyl] | Yellow. |
| 14 | [structure: 4-amino-2-chlorobenzoyl-NH-phenyl-NH-CO-4-methoxyphenyl] | Do. |

EXAMPLE 15

15.3 g. of 1,3,3-trimorpholino-4,5,6,7-tetrachloroisoindolenine and 12.3 g. of 2,4-dichloro-5-aminobenzoic acid amide are boiled while stirring well in 350 g. of glacial acetic acid. The condensation is completed after 10 minutes. The precipitated yellow dyestuff is filtered off at 100° and washed first with ethanol and then with acetone and dried. The yield is 18.7 g. The greenish yellow pigment of the formula given below has very good fastness to migration, cross lacquering and light.

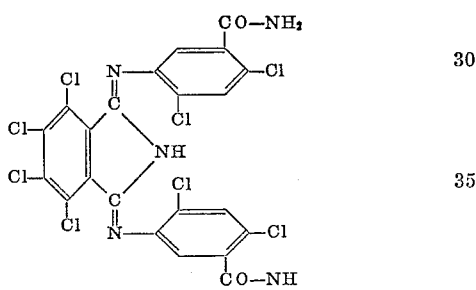

EXAMPLE 16

10.74 g. of 1,3,3,4,5,6,7-heptachloroisoindolenine and 12.3 g. of 2,4-dichloro-5-aminobenzoic acid amide are boiled for 35 minutes in 330 g. of chlorobenzene. The precipitated dyestuff is filtered off at 100° and washed first with ethanol and then with acetone and dried. The yield is 17 g. The greenish yellow pigment is identical with that described in Example 15.

EXAMPLE 17

5.6 g. of 1-amino-3-imino-4,5,6,7-tetrachloroisoindolenine and 14 g. of 3-amino-4-chlorobenzoic acid-(2',4',5'-trichlorophenylamide) are boiled for 45 minutes in 250 g. of glacial acetic acid. The precipitated yellow dyestuff of the formula given below is filtered off while still hot and washed with ethanol and then with acetone and dried. The yield is 15.5 g. The greenish yellow pigment has similarly good fastness properties to that described in Example 11.

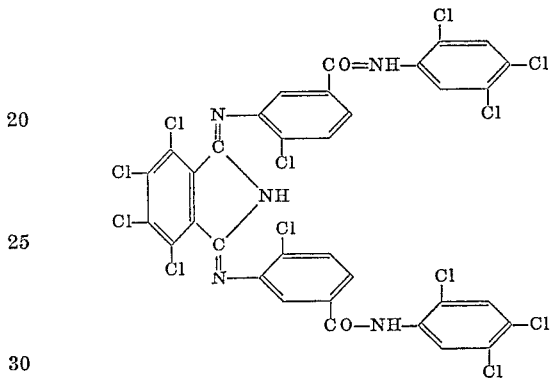

EXAMPLE 18

10.35 g. of 1,3,3-trimethoxy-4,5,6,7-tetrachloroisoindolenine and 8.2 g. of 3-aminobenzoic acid amide are suspended in 260 g. of glacial acetic acid and boiled for 10 minutes while stirring well. A colourless solution is first formed which, on heating, quickly turns yellow. The pigment begins to precipitate in crystalline form at 60–70°. It is kept at the boil for 5 minutes and then filtered off at boiling temperature. The yellow pigment is washed with alcohol and then with acetone and dried. The yield is 15 g. The pigment, which has very good fastness to cross lacquering, migration and light, corresponds to the formula

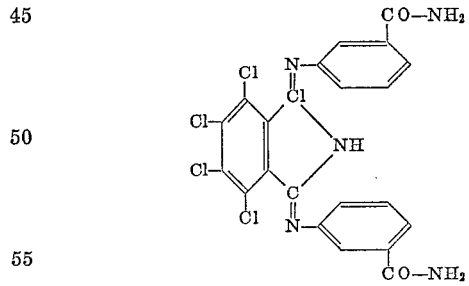

Pigments having similarly good fastness properties are obtained if the 3-aminobenzoic acid amide mentioned in the example are replaced by equimolar amounts of one of the amines given in Table 2. The colour of the prints on paper are given in column 3.

TABLE 2

| No. | Amine | Shade of print on paper |
|---|---|---|
| 19 | Cl-[phenyl with NH₂]-CO-NH₂ | Greenish yellow. |
| 20 | Cl-[phenyl with NH₂]-CO-NH-[phenyl]-Cl | Do. |
| 21 | Cl-[phenyl with NH₂]-CO-NH-[phenyl with Cl]-Cl | Do. |

TABLE 2—Continued
| No. | Amine | Shade of print on paper |
|---|---|---|
| 22 | 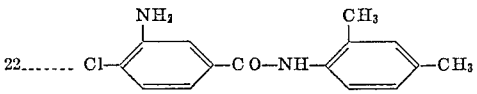 | Greenish yellow. |
| 23 | 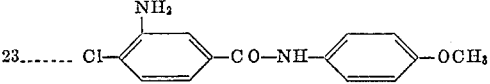 | Do. |
| 24 | 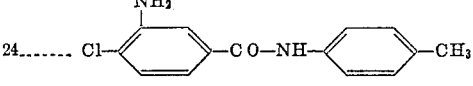 | Do. |
| 25 | 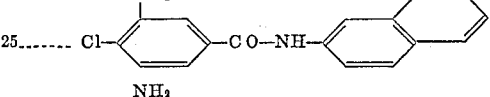 | Reddish yellow. |
| 26 | 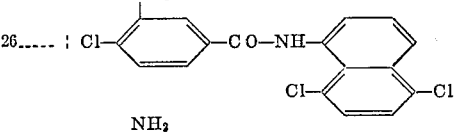 | Do. |
| 27 | 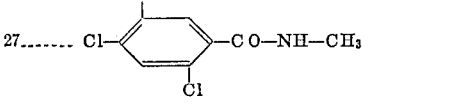 | Do. |
| 28 | 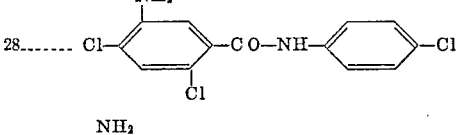 | Do. |
| 29 | 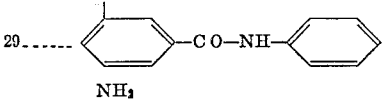 | Greenish yellow |
| 30 | 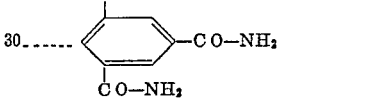 | Do. |
| 31 | 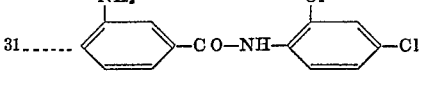 | Do. |
| 32 | 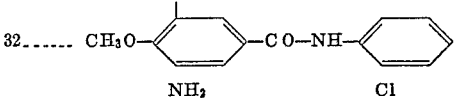 | Reddish yellow. |
| 3 | 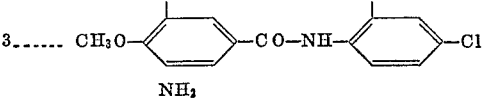 | Do. |
| 34 | 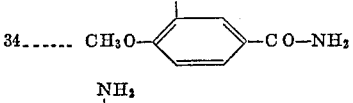 | Do. |
| 35 | 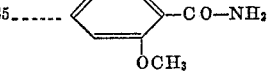 | Do. |
| 36 | 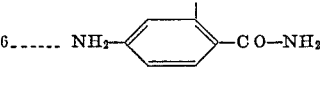 | Greenish yellow. |

TABLE 2—Continued

| No. | Amine | Shade of print on paper |
|---|---|---|
| 37 | $NH_2$—C₆H₃(Cl)—CO—NH—C₆H₄—Cl | Greenish yellow. |
| 38 | $NH_2$—C₆H₃(CH₃)—CO—$NH_2$ | Reddish yellow. |
| 39 | $CH_3$—C₆H₃($NH_2$)—CO—$NH_2$ | Do. |
| 40 | $CH_3$—C₆H₃($NH_2$)—CO—NH—C₆H₃(Cl)—Cl | Do. |
| 41 | $CH_3O$—C₆H₂($NH_2$)($OCH_3$)—CO—$NH_2$ | Yellowish red. |
| 42 | $NH_2$—C₆H₄—CO—$NH_2$ | Do. |
| 43 | $NH_2$—C₆H₄—CO—NH—C₆H₂(Cl)(Cl)(Cl) | Do |
| 44 | C₆H₄($NH_2$)—CO—$NH_2$ | Do. |
| 45 | C₆H₄($NH_2$)—CO—NH—C₆H₄—Cl | Do. |
| 46 | $NH_2$—C₆H₄—CO—NH—C₆H₃(Br)—Br | Reddish yellow. |
| 47 | Br—C₆H₃($NH_2$)—CO—NH—C₆H₅ | Yellow. |
| 48 | $NH_2$—C₆H₃(CO—NH—C₆H₅)—CO—NH—C₆H₅ | Do. |
| 49 | $NH_2$—C₆H₃[CO—NH—C₆H₃(Cl)(Cl)]—CO—NH—C₆H₃(Cl)(Cl) | Do. |
| 50 | $NH_2$—C₆H₃(CO—NH—C₆H₄—Br)—CO—NH—C₆H₄—Br | Do. |

TABLE 2—Continued

| No. | Amine | Shade of print on paper |
|---|---|---|
| 51 | 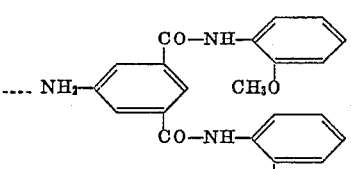 | Yellow. |
| 52 | 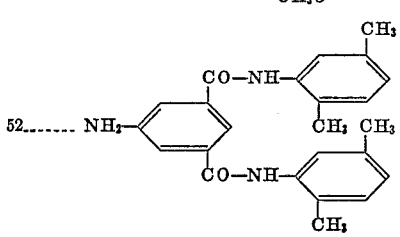 | Do. |

EXAMPLE 53

6.9 g. of 1,3,3-trimethoxy-4,5,6,7-tetrachloroisoindolenine and 9.9 g. of 4-chlorobenzoic acid-(3'-aminophenylamide) in 200 g. of glacial acetic acid are brought to the boil within 5 minutes while stirring well. At first a colourless solution is formed which, on heating, quickly turns yellow. The yellow dyestuff begins to precipitate at 60°. It is boiled for another 5 minutes and then filtered off at boiling temperature. The greenish yellow dyestuff is washed with alcohol and then with acetone and dried. The yield is 12.8 g. The pigment has good fastness to cross laquering, migration and light, and corresponds to the formula

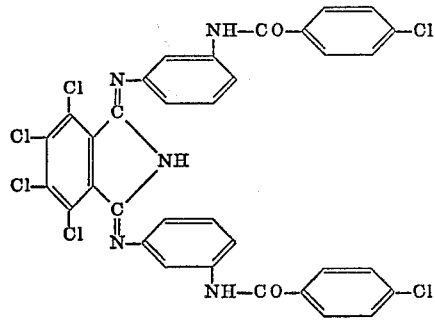

The same pigment is obtained if, instead of 6.9 g. of 1,3,3-trimethoxy-4,5,6,7-tetrachloroisoindolenine, 10.2 g. of 1,3,3-trimorpholino-4,5,6,7-tetrachloroisoindolenine or 5.6 g. of 1-amino-3-imino-4,5,6,7-tetrachloroisoindolenine are used.

If the 9.9 g. of 4-chlorobenzoic acid-(3'-aminophenylamide) are replaced by equimolar amounts of one of the amines given in the following Table 3, then with otherwise the same procedure, pigments are obtained which have similarly good fastness properties.

TABLE 3

| No. | Amine | Shade of print on paper |
|---|---|---|
| 54 | 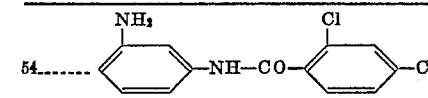 | Greenish yellow. |
| 55 | 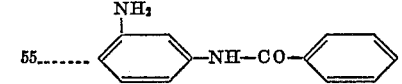 | Do. |
| 56 | 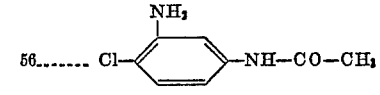 | Reddish yellow. |
| 57 | 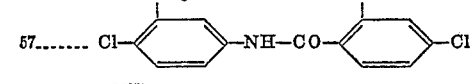 | Do. |
| 58 | 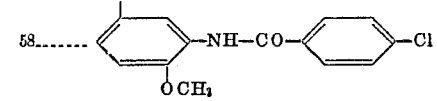 | Do. |

TABLE 3—Continued
| No. | Amine | Shade of print on paper |
|---|---|---|
| 59 | 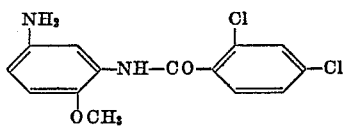 | Reddish yellow. |
| 60 | 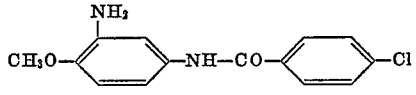 | Do. |
| 61 | 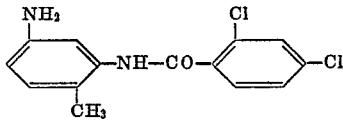 | Do. |
| 62 | 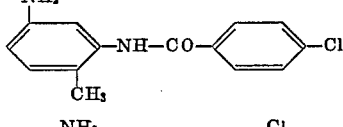 | Do. |
| 63 | 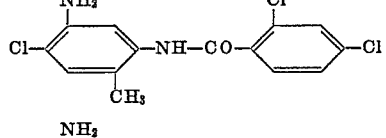 | Do. |
| 64 | 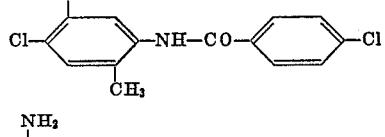 | Do. |
| 65 | 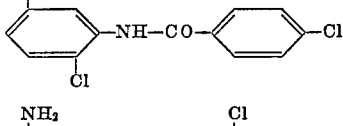 | Do. |
| 66 | 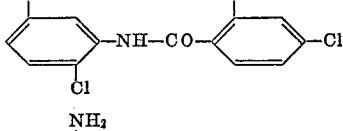 | Do. |
| 67 | 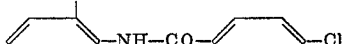 | Do. |
| 68 | 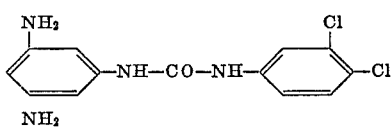 | Do. |
| 69 | 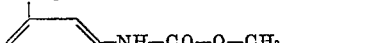 | Do. |
| 70 | 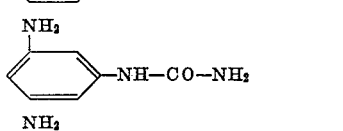 | Yellow. |
| 71 | 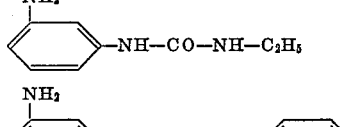 | Do. |
| 72 | 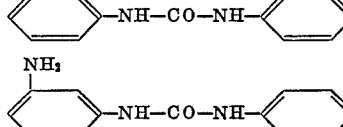 | Do. |
| 73 |  | Do. |

TABLE 3—Continued

| No. | Amine | Shade of print on paper |
|---|---|---|
| 74 | NH₂–⟨⟩–NH–CO–NH–⟨⟩–OCH₃ | Yellow. |
| 75 | NH₂–⟨⟩–NH–CO–NH–⟨Br,Br⟩ | Do. |
| 76 | NH₂–⟨–O–⟨⟩–CH₃⟩–NH–CO–⟨⟩–OCH₃ | Do. |
| 77 | NH₂–⟨–O–⟨⟩–Br⟩–NH–CO–⟨⟩–CH₃ | Do. |
| 78 | Cl–⟨⟩–O–⟨NH₂⟩–NH–CO–⟨⟩–Br | Do. |

EXAMPLE 79

12.44 g. of 4-chlorobenzoic acid-(2'-chloro-4'-amino-5'-methoxyphenylamide) are heated to 80° in 320 g. of glacial acetic acid. 6.9 g. of 1,3,3-trimethoxy-4,5,6,7-tetrachloroisoindolenine are added all at once while stirring well and the whole is then boiled for 5 minutes. The precipitated red pigment is filtered off hot and washed with alcohol and then with acetone and dried. The yield is 16.7 g. The red pigment of the formula given below, has good fastness to cross lacquering, migration and light.

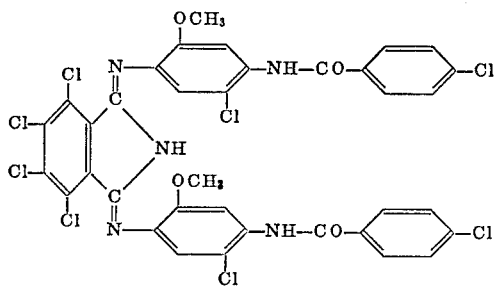

EXAMPLE 80

10.2 g. of 1,3,3-trimorpholino-4,5,6,7-tetrachloroisoindolenine and 12.3 g. of 4-chlorobenzoic acid-(2',5'-dimethoxy-4'-aminophenylamide) are boiled for 15 minutes in 300 g. of glacial acetic acid while stirring vigorously. The precipitated red pigment is filtered off while still hot, washed with ethanol and then with acetone and dried. The blueish red pigment of the formula

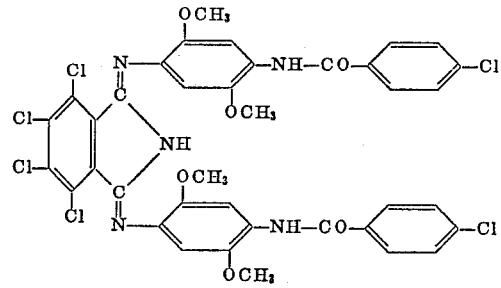

is fast to cross lacquering, migration and light.

If instead of 12.3 g. of 4-chlorobenzoic acid-(2',5'-dimethoxy-4'-aminophenylamide), equimolar amounts of an amine given in Table 4 is used and otherwise the procedure given in Example 80 is followed, then similarly good pigments are obtained which have the shades given in column 3 of Table 4.

TABLE 4

| No. | Amine | Shade of print on paper |
|---|---|---|
| 81 | NH₂–⟨CH₃O, Cl⟩–NH–CO–⟨⟩–Cl | Blueish red. |
| 82 | NH₂–⟨CH₃O, Cl⟩–NH–CO–⟨⟩–Cl | Yellowish red. |
| 83 | NH₂–⟨O–⟨⟩, Cl⟩–NH–CO–⟨⟩–Cl | Do. |

TABLE 4—Continued

| No. | Amine | Shade of print on paper |
|---|---|---|
| 84 | NH₂–[2,5-Cl₂-C₆H₂]–NH–CO–C₆H₅ | Orange. |
| 85 | NH₂–[2,5-Cl₂-C₆H₂]–NH–CO–C₆H₄–Cl | Do. |
| 86 | NH₂–[2,5-Cl₂-C₆H₂]–NH–CO–C₆H₃(Cl)–Cl | Do. |
| 87 | NH₂–[2,5-Cl₂-C₆H₂]–NH–CO–C₆H₄–Cl | Do. |
| 88 | NH₂–[3-CH₃O-C₆H₃]–NH–CO–C₆H₄–Cl | Yellowish red. |
| 89 | NH₂–[3-CH₃O-C₆H₃]–NH–CO–C₆H₃(Cl)–Cl | Do. |
| 90 | NH₂–[3-Br-C₆H₃]–NH–CO–C₆H₄–Cl | Reddish yellow. |
| 91 | NH₂–[3-Cl-C₆H₃]–NH–CO–C₆H₄–Cl | Do. |
| 92 | NH₂–[3-Cl-C₆H₃]–NH–CO–C₆H₃(Cl)–Cl | Do. |
| 93 | NH₂–[3-CH₃-C₆H₃]–NH–CO–C₆H₄–Cl | Do. |
| 94 | NH₂–[3-CH₃-C₆H₃]–NH–CO–C₆H₃(Cl)–Cl | Do. |
| 95 | NH₂–[3,5-(CH₃O)₂-C₆H₂]–NH–CO–CH₃ | Orange. |
| 96 | NH₂–[3,5-(OC₂H₅)₂-C₆H₂]–NH–CO–C₆H₅ | Reddish brown. |
| 97 | NH₂–[3-CH₃O-5-CH₃-C₆H₂]–NH–CO–C₆H₅ | Yellowish brown. |

TABLE 4—Continued

| No. | Amine | Shade of print on paper |
|---|---|---|
| 98 | NH₂—[C6H3(Cl)(OCH₃)]—NH—CO—[C6H4]—Cl | Yellowish red. |
| 99 | NH₂—[C6H3(Cl)(OCH₃)]—NH—CO—[C6H4]—Cl | Orange. |
| 100 | NH₂—[C6H3(Cl)(OCH₃)]—NH—CO—[C6H4(Cl)]—Cl | Do. |
| 101 | NH₂—[C6H3(Cl)(Cl)]—NH—CO—[C6H4]—Cl | Reddish yellow. |
| 102 | NH₂—[C6H4]—NH—CO—[C6H4]—Cl | Do. |
| 103 | NH₂—[C6H3(Cl)]—NH—CO—[C6H4(Cl)]—Cl | Do. |

EXAMPLE 104

5.1 g. of 1,3,3-trimorpholino-4,5,6,7-tetrachloroisoindolenine and 4.13 g. of 4-chloro-3-aminobenzene sulphonic acidamide are boiled for 3 minutes in 100 g. of glacial acetic acid. The precipiated yellow dyestuff is filtered off while still hot, washed with ethanol and acetone and dried. 6.4 g. of a yellow pigment of the formula given below are so obtained. The pigment has very good fastness to cross lacquering and light and good fastness to migration.

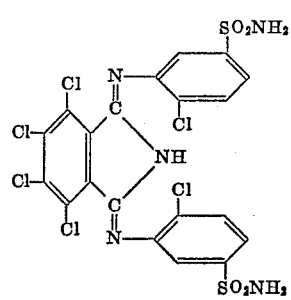

The 1,3,3 - trimorpholino - 4,5,6,7-tetrachloroisoidolenine is produced by reacting 1,3,3,4,5,6,7-heptachloroisoindolenine with morpholine in benzene. It melts at 180°.

If the 4.13 g. of 4-chloro-3-aminobenzene sulphonic acid amide are replaced by equimolar amounts of one of the amines given in the following Table 5 then with otherwise the same procedure, similar fast pigments are obtained which have the shades given in column 3.

TABLE 5

| No. | Amine | Shade of print on paper |
|---|---|---|
| 105 | H₂N—[C6H4]—SO₂NH₂ | Yellow. |
| 106 | H₂N—[C6H4]—SO₂NHCH₃ | Do. |
| 107 | H₂N—[C6H4]—SO₂NHC₂H₅ | Do. |
| 108 | H₂N—[C6H3(SO₂NHCH₃)]—Cl | Do. |
| 109 | H₂N—[C6H3(SO₂NH₂)]—CH₃ | Do. |
| 110 | H₂N—[C6H3(SO₂NH₂)]—OCH₃ | |
| 111 | H₂N—[C6H4]—SO₂—NH—CH₂—CH₂—OH | |

EXAMPLE 112

10.7 g. of 1,3,3-trimethoxy-4,5,6,7-tetrachloroisoindolenine are added at 100° to a solution of 11.3 g. of 2,3-dichloroaniline in 150 g. of glacial acetic acid. The yellow suspension formed is boiled for 5 minutes and the precipitate yellow dye-stuff is filtered off cold, washed with ethanol and acetone and dried. 16.65 g. of a pure yellow pigment of the formula given below are obtained. The pigment has good colour strength, very good fastness to heat and light and good fastness to solvents and cross lacquering.

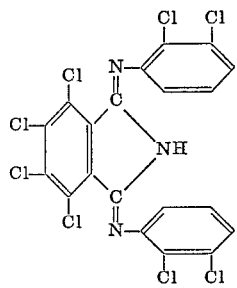

The 1,3,3-trimethoxy-4,5,6,7-tetrachloroisoindolenine is produced by reacting 1,3,3,4,5,6,7-heptachloroisoindolenine with sodium methylate. After recrystallisation from methanol it melts at 115–116°.

If the 11.3 g. of 23-dichloroaniline are replaced by equimolar amounts of one of the amines mentioned in the following Table 6 then, with otherwise the same procedure, fast pigments of good colour strength are obtained which have the shades given in column 3.

TABLE 6

| No. | Amine | Shade of print on paper |
|---|---|---|
| 113 | H₂N—C₆H₃(Cl)(Cl) (2,4-dichloro) | Yellow. |
| 113a | H₂N—C₆H₃(Cl)(Cl) (2,5-dichloro) | Do. |
| 114 | H₂N—C₆H₃(CF₃)(Cl) | Greenish yellow. |
| 115 | H₂N—C₆H₃(CH₃)(Cl) | Reddish yellow. |
| 116 | H₂N—C₆H₃(Cl)(CH₃) | Greenish yellow. |
| 117 | H₂N—C₆H₃(CH₃O)(Cl) | Orange-yellow. |
| 118 | H₂N—C₆H₃(Br)(Br) | Yellow. |
| 119 | H₂N—C₆H₃(Cl)(CN) | Yellow. |
| 120 | H₂N—C₆H₂(Cl)(Cl)(Cl) | Do. |
| 121 | 1,5-diamino-4,8-dichloronaphthalene | Do. |
| 122 | 2-aminonaphthalene | Do. |
| 123 | 2-aminodibenzofuran (fluorenone-amine) | Yellowish red. |
| 124 | 1-aminoanthraquinone | Yellow. |

EXAMPLE 125

18 g. of 1,3,3,4,5,6,7-heptachloroisoindolenine and 23.8 g. of 4-phthaloylamino-1-aminobenzene, produced by condensation of phthalic acid anhydride with 4-nitroaniline and subsequent reduction of the nitro group, are heated in 300 g. of 1,2-dichlorobenzene for 20 minutes at 150°. The precipitated yellow dyestuff is filtered off while still hot, washed with ethanol and then with acetone and dried. In this way, 32 g. of a reddish yellow pigment of the following formula are obtained. The pigment has very good fastness to cross lacquering, migration and light.

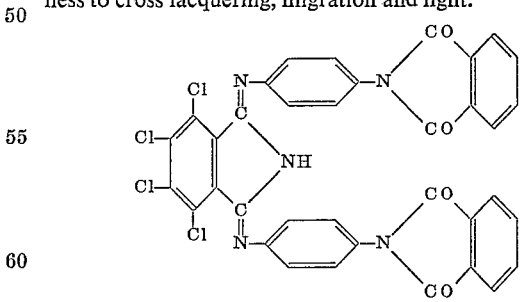

If the 23.8 g. of 4-phthaloylamino-1-aminobenzene are replaced by equimolar amounts of one of the amines given in the following Table 7, then with otherwise the same procedure, similar fast pigments are obtained which have the shades given in column 3.

TABLE 7

| No. | Amine | Shade in PVC sheets |
|---|---|---|
| 126 | H₂N—C₆H₄—N(CO—CH₂)(CO—CH₂) | Yellow. |

TABLE 7—Continued

| No. | Amine | Shade in PVC sheets |
|---|---|---|
| 127 | (H₂N–phenyl–N-phthalimide, tetrachloro) | Reddish yellow. |
| 128 | (H₂N–phenyl(meta)–N-phthalimide) | Do. |
| 129 | (H₂N–phenyl(meta)–N-phthalimide, tetrachloro) | Yellow. |
| 130 | (H₂N–phenyl–N-pyridine dicarboximide) | Do. |
| 131 | (H₂N–2,5-dichlorophenyl–N-phthalimide) | Reddish yellow. |
| 132 | (H₂N–2,5-dimethoxyphenyl–N-phthalimide) | Orange. |
| 132a | (H₂N–2,5-diethoxyphenyl–N-phthalimide) | Do. |
| 133 | (H₂N–2-methoxy-5-chlorophenyl–N-phthalimide) | Do. |
| 134 | (H₂N–biphenyl–N-phthalimide) | Yellowish orange. |
| 135 | (H₂N–dimethylbiphenyl–N-tetrachlorophthalimide) | Do. |
| 136 | (H₂N–dimethoxybiphenyl–N-tetrachlorophthalimide) | Orange. |
| 136a | (H₂N–dichlorobiphenyl–N-phthalimide) | |

EXAMPLE 137

5.47 g. of a 1,3,3-trichloro-4,5,6,7-tetrahalogenoisoindolenine, the halogen atoms of which consist of a mixture of chlorine and bromine, and 4.08 g. of 2-chloro-5-aminobenzoic acid amide in 150 g. of glacial acetic acid are boiled for 5 minutes. The precipitated yellow dyestuff is filtered off, washed with ethanol and then with acetone and dried. 6.5 g. of a yellow pigment are so obtained which has very good fastness to light and solvents.

The 1,3,3 - trichloro-4,5,6,7-tetrahalogenoisoindolenine is produced by reaction of tetrabromophthalimide and 2 mols of phosphorus pentachloride in boiling phosphorus oxychloride. In this way about 20% (molar) of the bromine atoms are replaced by chlorine atoms.

Yellow pigments having similarly good properties are obtained if the 4.08 g. of 2-chloro-5-aminobenzoic acid amide is replaced by equimolar amounts of 2,3,4-trichloroaniline, 4-phthaloylamino - 1 - aminobenzene or 4-chlorobenzoic acid-(3'-aminophenylamide).

EXAMPLE 138

40 g. of 1,3-bis-phenylimino-4,5,6,7-tetrachloroisoindoline, 360 g. of hydrate of alumina, 600 g. of linseed oil varnish of medium viscosity and 2 g. of cobalt linoleate are mixed on a set of mixing rollers and rubbed. A printing ink is obtained which produces greenish yellow prints on paper which have excellent fastness to light. Prints of greater colour strength, more red shade and improved fastness properties to solvents are obtained if, instead of 40 g. of 1,3-bis-phenylimino-4,5,6,7-tetrachloroisoindoline, 40 g. of 1,3-bis-(2',4'-dichlorophenylimino)-4,5,6,7-tetrachloroisoindoline or 40 g. of 1,3-bis-(2',5'-dichlorophenylimino)-4,5,6,7-tetrachloroisoindoline are used.

EXAMPLE 139

15 g. of 1,3-bis-(2',3'-dichlorophenylimino)-4,5,6,7-tetrachloroisoindoline, 20 g. of a wax-free shellac, 3 g. of dibutyl phthalate, 5 g. of polyvinyl butyral, 5 g. of ethylene glycol monoethyl ether and 52 g. of ethanol are milled together in a ball mill. On applying the suspension obtained as flexoprint colour on paper, a yellow colouring is obtained which has a very good fastness to solvents and light.

EXAMPLE 140

15 g. of a collodion wool having a 35% content of butanol, 15 g. of a phthalate resin modified with ricinus oil, 15 g. of a 70% butanolic solution of a urea resin lacquer, 20 g. of butyl acetate, 10 g. of glycol monoethyl ether, 20 g. of toluene and 5 g. of alcohol are made up into a lacquer. This lacquer is then pigmented with 2 g. of 1,3-bis-(2'-chloro-5'-sulphamylphenylimino)-4,5,6,7-tetrachloroisoindoline (produced according to Example 104) and 2 g. of titanium dioxide (Rutil) and milled. After spraying the lacquer onto cardboard and drying, a yellow coating is obtained which has very good fastness to light and cross lacquering.

EXAMPLE 141

1 g. of 1,3-bis-(4'-phthaloylaminophenylimino)-4,5,6,7-tetrachloroisoindoline (produced according to Example 125) and 5 g. of titanium dioxide are added to 100 g. of an annealing lacquer consisting of 58.5 g. of a 60% solution of an alkyl resin of coconut oil in xylene, 23 g. of a 65% melamine resin lacquer in butanol, 17 g. of xylene and 1.5 g. of butanol. The mixture is milled for 48 hours in a ball mill and the lacquer so pigmented is sprayed onto cleansed metal surfaces. After annealing at 120° a reddish yellow colour is obtained which has good fastness to light and cross lacquering.

EXAMPLE 142

4 g. of 1,3-bis-[4'-(3'',4'',5'',6''-tetrachlorophthaloylamino) - phenylimino] - 4,5,6,7-tetrachloroisoindoline (produced according to Example 127), 35 g. of a 60% solution of an alkyd resin, modified with urea/formaldehyde, in xylene/butanol 1:1, 10 g. of terpentine oil and 5 g. of xylene are milled for 48 hours in a ball mill. After spraying the coloured lacquer formed onto an aluminium sheet and annealing at 120°, a reddish yellow coating having very good fastness to light, heat and cross lacquering is obtained.

EXAMPLE 143

80 g. of an unsaturated liquid polyester resin, 19.72 g. of monostyrene and 0.28 g. of a cobalt siccative containing 16% cobalt, and 1 g. of 1,3-bis-[2',5'-dichloro-4' - (4''-chlorobenzoylamino)-phenylimino]4,5,6,7 - tetrachloroisoindoline (produced according to Example 85) and 5 g. of titanium dioxide (Rutil) are milled for 48 hours in a ball mill. Shortly before using this lacquer, a mixture consisting of 4.15 g. of cumene hydrogen peroxide (70%), 2.52 g. of ethyl acetate and 13.33 g. of butyl acetate is added. After paintaing this mixture onto cardboard and drying in the air, an orange coloured coating having very good fastness to light, heat and cross lacquering is obtained.

EXAMPLE 144

24.5 g. of an unesterified epoxy resin, 10.5 g. of an oil-reactive alkylphenol resin, 35 g. of xylene and 30 g. of diacetone alcohol are worked up into a lacquer which is then milled for 24 hours in a ball mill with 4 g. of 1,3 - bis-[4'-methyl-3'-(4''-chlorobenzoylamino)-phenylimino] - 4,5,6,7-tetrachloroisoindoline (produced according to Example 62). After spraying onto aluminium sheets and annealing at 120°, reddish yellow coatings having very good fastness to heat, cross lacquering and light are obtained.

EXAMPLE 145

67 g. of polyvinyl chloride powder (suspension polymer), 33 g. of dioctyl phthalate, 2 g. of dibutyl tin dilaurate, 0.3 g. of a stabiliser based on phosphate and 0.7 g. of the pigment produced according to Example 1 by condensation of 1,3,3-trimethoxy-4,5,6,7-tetrachloroisoindolenine with 2-chlor-5-aminobenzoic acid-(4'-chlorophenylamide) are mixed and worked up on a set of hot mixing rollers for 15 minutes at 160°. A sheet of 0.4 mm. thickness is then produced on the calender. It is coloured pure geenish yellow. The colouring is stable to heat and fast to migration.

EXAMPLE 146

A finely milled paste consisting of 50 g. of polyvinyl chloride powder (emulsion polymer), 32 g. of dioctyl phthalate, 1 g. of dibutyl tin dilaurate, 0.25 g. of a stabiliser based on phosphate, 6 g. of chalk powder, 10.75 g. of mineral spirits and 2.5 g. of a finely milled 40% paste of the pigment, produced according to Example 1 by condensation of 1,3,3-trimethoxy-4,5,6,7-tetrachloroisoindolenine with 2 - chloro - 5-aminobenzoic acid-(4'-chlorophenylamide), in dioctyl phthalate is spread in a thickness of 0.2 mm. on cotton. The coated fabric is then heated for 3 minutes at 160° whereupon another coating of 0.3 mm. thickness is applied and the fabric is heated for another 3 minutes at 160°. Greenish yellow synthetic leather is obtained the colour of which has very good fastness to migration and also good fastness to rubbing and wet.

EXAMPLE 147

0.2 g. of the pigment produced according to Example 15 by condensation of 1,3,3-trimorpholino-4,5,6,7-tetrachloroisoindolenine and 2,4-dichloro-5-aminobenzoic acid amide, and 100 g. of polystyrene granulate are mixed and worked at 130° on a set of hot mixing rollers until the coluring appears to be homogeneous. The mass is then pressed into sheets between chromium plated plates at 150°. The yellow colour of the sheets has good fastness to light. The pigmenting can also be done in the ex-

EXAMPLE 148

0.2 g. of the pigment produced according to Example 91 by condensation of 1,3,3-trimorpholino-4,5,6,7-tetrachloroisoindolenine and 4-chlorobenzoic acid-(2'-chloro-4'-amino-phenylamide), 1 g. of titanium dioxide (Rutil) and 100 g. of polyethylene granulate are mixed in a drum and then the mixture is worked up on a set of 130° hot mixing rollers. The mass is pressed into sheets while hot or is formed in the extruder. The sheets have a beautiful reddish yellow shade which has good fastness to light.

EXAMPLE 149

A rubber mixture consisting of 40 g. of hevea latex crepe, 24.5 g. of barium sulphate, 24.8 g. of chalk, 5.22 g. of Lithopone, 4.0 g. of zinc oxide, 0.2 g. of paraffin, 0.7 g. of sulphur, 0.18 g. of vulcanising agent, 0.4 g. of an agar and 2 g. of the pigment obtained according to Example 5 by condensation of 1,3,3-trimethoxy-4,5,6,7-tetrachloroisoindolenine with 2-chloro-5-aminobenzoic acid-(2',5'-dichlorophenylamide) are worked up in the usual way on a set of mixing rollers and vulcanised in the press for 10 minutes at 140°. A greenish yellow colouration is obtained which has good fastness of light and migration.

EXAMPLE 150

50 g. of the pigment produced (Example 92) by condensation of 1,3,3-trimorpholino-4,5,6,7-tetrachloroisoindolenine and 2,4-dichlorobenzoic acid - (2' - chloro-4'-aminophenylamide), finely distributed by milling with sand, and 12.5 g. of the sodium salt of the condensation product of naphthalene-2-sulphonic acid with formaldehyde, 0.5 g. of sodium hydroxide and 200 g. of water are milled in a ball mill for 72 hours. 5 g. of this paste are added to 2000 g. of a sodium xanthogenate solution, produced from 180 g. of cellulose, 180 g. of sodium hydroxide, 640 g. of carbon disulphide and 1000 g. of water and the suspension is homogenised by stirring. After standing for 12 hours under vacuum the viscose is spun in the usual way, desulphurised, washed, brightened and dried. Pure yellow fibres are obtained the colour of which has good wet and light fastness properties.

EXAMPLE 151

0.1 g. of the pigment produced according to Example 91 by condensation of 1,3,3-trimorpholino-4,5,6,7-tetrachloroisoindolenine and 4-chlorobenzoic acid-(2'-chloro-4'-aminophenylamide), 0.5 g. of titanium dioxide (Rutil) an 100 g. of polypropylene granulate are mixed in a drum and the mixture is then worked up on a set of 130° hot mixing rollers until a homogeneously colored mixture is attained. The mass is pressed while hot into sheets of 1 mm. thickness. The sheets have a beautiful reddish yellow colour which has good fastness to light.

EXAMPLE 152

100 g. of a pulverulent formaldehyde/urea resin suitable for moulding materials, 10 g. of lithopone and 1 g. of the pigment produced according to Example 19 by condensing 1,3,3-trimethoxy-4,5,6,7-tetrachloroisoindolenine and 3-amino-4-chlorobenzoic acid amide, are milled in a ball mill for 16 hours. The mass is then pressed into forms at 140–160°. The greenish yellow samples have good stability to light and heat.

We claim:
1. A pigment of the formula

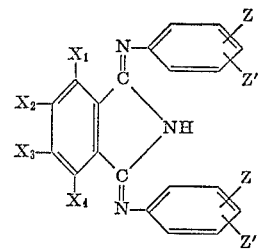

wherein each of $X_1$, $X_2$, $X_3$ and $X_4$ is a member selected from the group consisting of chlorine and bromine,
Z is a member selected from the group consisting of chlorine and bromine, and
Z' is a member selected from the group consisting of hydrogen, lower alkyl, lower alkoxy, trifluoromethyl and cyano.

2. 4,5,6,7-tetrachloroisoindoline in which each of the carbon atoms in 1 and 3 position is substituted by the grouping dichloro-phenyl-N=.

3. 4,5,6,7-tetrachloroisoindoline in which each of the carbon atoms in 1 and 3 position is substituted by the grouping trichloro-phenyl-N=.

4. 4,5,6,7-tetrachloroisoindoline in which each of the carbon atoms in 1 and 3 position is substituted by the grouping chloro-naphthyl-N=.

5. 4,5,6,7-tetrachloroisoindoline in which each of the carbon atoms in 1 and 3 position is substituted by the grouping fluorenonyl-N=.

References Cited

UNITED STATES PATENTS

| | | | |
|---|---|---|---|
| 2,739,151 | 3/1956 | Rosch et al. | 260—326.1 X |
| 2,739,155 | 3/1956 | Rosch et al. | 260—326.1 |
| 2,752,346 | 6/1956 | Rosch et al. | 250—326.1 X |

FOREIGN PATENTS 297,833  6/1954  Switzerland.

ALEX MAZEL, *Primary Examiner.*

J. NARCAVAGE, *Assistant Examiner.*